United States Patent
McCord

(10) Patent No.: US 12,422,089 B2
(45) Date of Patent: Sep. 23, 2025

(54) SYSTEM INCLUDING A HOLDING PART

(71) Applicant: SEW-EURODRIVE GMBH & CO. KG, Bruchsal (DE)

(72) Inventor: Cory McCord, Lyman, SC (US)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 124 days.

(21) Appl. No.: 18/267,248

(22) PCT Filed: Nov. 22, 2021

(86) PCT No.: PCT/EP2021/025456
§ 371 (c)(1),
(2) Date: Jun. 14, 2023

(87) PCT Pub. No.: WO2022/128147
PCT Pub. Date: Jun. 23, 2022

(65) Prior Publication Data
US 2024/0035613 A1     Feb. 1, 2024

Related U.S. Application Data

(60) Provisional application No. 63/125,007, filed on Dec. 14, 2020.

(30) Foreign Application Priority Data

Mar. 17, 2021 (DE) .......................... 102021001410.3

(51) Int. Cl.
*F16M 13/02*     (2006.01)
(52) U.S. Cl.
CPC .................. *F16M 13/02* (2013.01)

(58) Field of Classification Search
CPC .................................. F16M 13/02; B25H 3/00
See application file for complete search history.

(56) References Cited

U.S. PATENT DOCUMENTS

| | | | |
|---|---|---|---|
| 1,344,728 A * | 6/1920 | Greene | A47G 25/12 248/113 |
| 1,744,054 A | 1/1930 | Mosgrove | |
| 2,969,900 A | 1/1961 | Heuler | |

(Continued)

FOREIGN PATENT DOCUMENTS

| | | |
|---|---|---|
| DE | 102011120194 A1 | 6/2013 |
| EP | 2913576 A1 | 9/2015 |

OTHER PUBLICATIONS

International Report on Patentability issued in corresponding International Application No. PCT/EP2021/025456 dated Jun. 13, 2023, pp. 1-7.

(Continued)

*Primary Examiner* — Monica E Millner
(74) *Attorney, Agent, or Firm* — Carter, DeLuca & Farrell LLP

(57) ABSTRACT

A system includes a holding part, and the holding part has a base part, side parts, insertion parts, a bottom part, and a cover part. The base part together with the side parts, the insertion parts, the bottom part, and the cover part is arranged as one piece, e.g., as a single piece. The side parts are bent away from the base part such that the holding part has a mounting region that tapers with decreasing distance from the base part.

22 Claims, 1 Drawing Sheet

(56) References Cited

U.S. PATENT DOCUMENTS

| | | | | |
|---|---|---|---|---|
| 3,095,092 | A * | 6/1963 | Magarian | B25H 3/04 211/89.01 |
| 3,178,141 | A * | 4/1965 | Bloom | A47L 13/512 248/113 |
| 3,928,894 | A * | 12/1975 | Bury | B60R 1/04 24/304 |
| 4,333,623 | A * | 6/1982 | May | F16M 13/00 248/176.2 |
| 4,739,242 | A * | 4/1988 | McCarty | H02J 7/0013 30/DIG. 1 |
| 5,071,012 | A * | 12/1991 | Jailor | A47L 9/0027 D6/567 |
| 5,174,539 | A * | 12/1992 | Leonard | F16M 13/02 248/300 |
| 5,690,684 | A * | 11/1997 | Andrews | B25H 3/006 248/222.51 |
| 6,142,349 | A | 11/2000 | Roberson | |
| 6,279,741 | B1 * | 8/2001 | Arvin | E06C 7/14 206/349 |
| 6,779,766 | B1 * | 8/2004 | Hade | F16M 13/022 248/228.2 |
| 6,880,794 | B1 * | 4/2005 | Kahn | A45F 5/02 248/315 |
| 7,591,385 | B2 * | 9/2009 | Brooks | B25H 3/04 211/94.01 |
| 8,646,602 | B2 * | 2/2014 | Wang | A47F 5/0006 206/372 |
| 10,361,547 | B2 * | 7/2019 | Kellerman | H02G 3/125 |
| 10,703,302 | B1 | 7/2020 | Grant | |
| 11,446,809 | B2 * | 9/2022 | Wages | B25H 3/003 |
| 2005/0247841 | A1 * | 11/2005 | Brooks | B25H 3/04 248/316.8 |
| 2008/0032190 | A1 * | 2/2008 | Furuta | H01M 50/244 429/163 |
| 2015/0097348 | A1 * | 4/2015 | Steinfels | F16M 11/2092 280/47.35 |
| 2018/0319028 | A1 * | 11/2018 | Kraus | B26B 19/28 |
| 2019/0077006 | A1 * | 3/2019 | Velderman | B25H 3/04 |

OTHER PUBLICATIONS

International Search Report issued in corresponding International Application No. PCT/EP2021/025456 dated Mar. 4, 2022, pp. 1-2, English Translation.

* cited by examiner

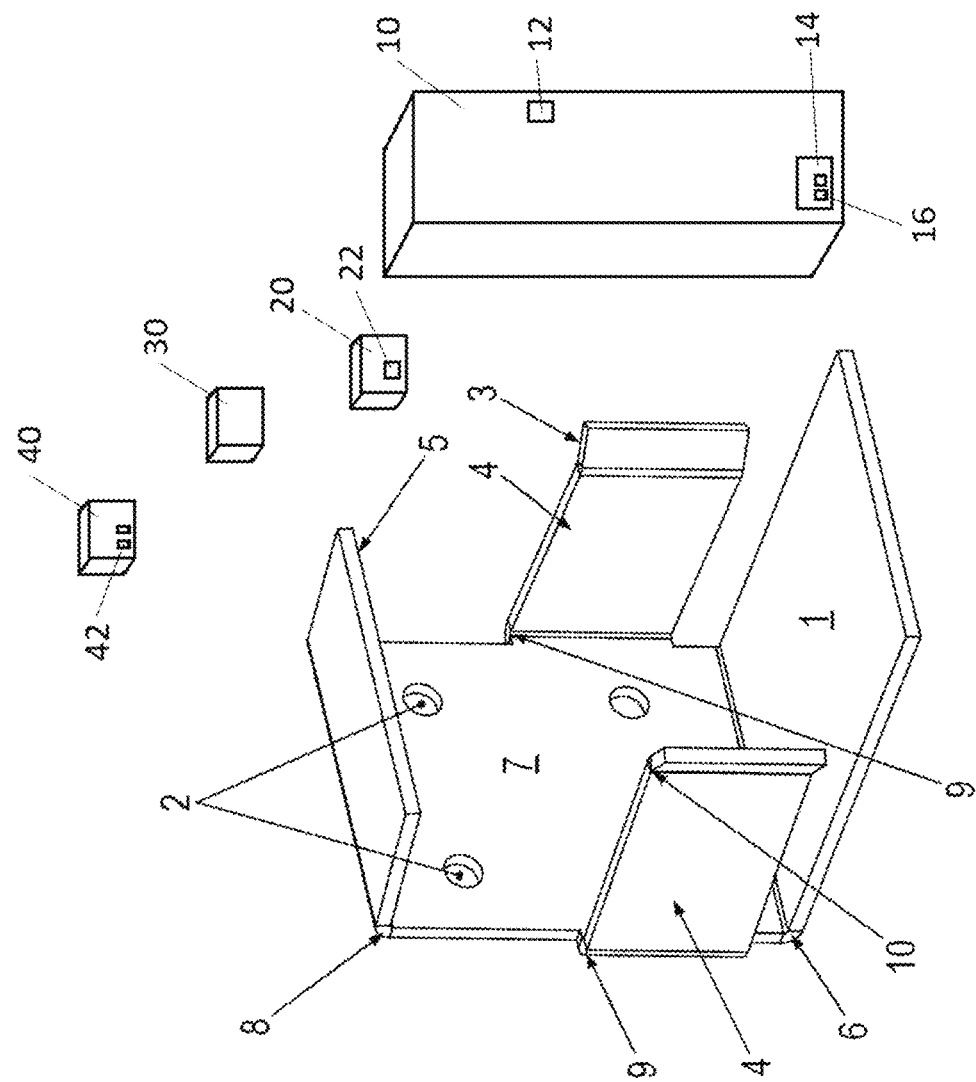

SYSTEM INCLUDING A HOLDING PART

CROSS-REFERENCE TO RELATED APPLICATIONS

The present application, which is the national stage of PCT Application No. PCT/EP2021/025456, having an international filing date of Nov. 22, 2021, and which claims priority to Application No. 10 2021 001 410.3, filed in the Federal Republic of Germany on Mar. 17, 2021, and to U.S. Provisional Application No. 63/125,007, filed on Dec. 14, 2020, claims the benefit of U.S. Provisional Application No. 63/125,007, filed on Dec. 14, 2020.

FIELD OF THE INVENTION

The present invention relates to a system having a holding part.

BACKGROUND INFORMATION

Certain conventional systems include a tool, in particular a battery-powered drill, for the manufacture of products.

SUMMARY

Example embodiments of the present invention provide for making a system more efficient.

According to example embodiments, in a system having a holding part, the holding part has a base part, side parts, insertion parts, a bottom part, and a cover part. The base part together with the side parts, the insertion parts, the bottom part, and the cover part is arranged as one piece, e.g., as a single part. The side parts are bent away from the base part such that the holding part has a mounting region that tapers with decreasing distance from the base part.

This offers the advantage that the system is made more efficient in that the tool is able to be accommodated by the holding part and is therefore able to be used from this secure position. In addition, the tool is rechargeable in the position and thus may not only be stored in a safe and protected manner but also makes it possible to utilize the time during which the tool is accommodated in the holding part in an efficient manner.

The accommodation in the holding part also provides greater protection of the tool from environmental effects.

The holding part is able to be fastened to a wall of the system or to a T-Beam of the system, for example.

Since the holding part may be produced as a punched and bent part, the side parts are brought into position by bending a sheet metal piece. However, the bending point induces greater elasticity so that the tool is able to be held in a nonpositive manner. This is so because the side parts, which are connected to the base part with greater elasticity, are elastically deflectable when the tool is inserted into the mounting region and are therefore able to hold the tool in an elastic manner. In addition, an identification control may be integrated into the holding part, which allows the tool to be charged only if the allocated tool is accommodated and furthermore induces a display as a function of the result of the control. In this manner, it is clearly and rapidly apparent if an incorrect tool is mounted. More specifically, a corresponding warning is able to be displayed even before the tool is mounted provided the range of the data transmission between a memory able to be read out in a contact-free manner and the reader device extends beyond the mounting range.

This makes it possible to provide holding devices of different sizes for individual tools in the system and/or holding devices that merely differ from one another by a charging voltage supplied by the respective holding device.

According to example embodiments, the holding device is produced as a punched and bent part, e.g., from sheet metal, the sheet thickness, e.g., being so thin that the side parts are elastically deflectable in relation to the base part. This offers the advantage that a simple production is possible and sufficient elasticity is provided by the bending so that an elastic, frictionally engaged, i.e., for example, nonpositive, support of the tool is possible. Thus, even if the used sheet metal has a great sheet thickness, elastic support is possible without any particular force expenditure and thus also without spring forces that damage the tool.

According to example embodiments, the bottom part is bent away from the base part at a bending angle, the bending angle, i.e., for example, the inner angle between the bottom part and base part, being greater than 90° and, for example, having a value of between 91° and 95°. This offers the advantage that the mounting region becomes increasingly tighter the farther the tool is inserted into the mounting region, and the elastic restoring force, e.g., spring force, which holds the tool and is induced by the increasing deflection of the bottom part, thus becomes greater.

According to example embodiments, the cover part is bent away from the base part at a bending angle, the bending angle, i.e., for example, the inner angle between the cover part and base part, being greater than 90°, and, for example, having a value of between 91° and 120°. This has the advantage that the mounting region becomes ever tighter the farther the tool is slipped into the mounting region, and the elastic restoring force, e.g., spring force, which holds the tool and is induced by the increasing deflection of the cover part, thus becomes greater.

According to example embodiments, the two side parts are bent away from the base part at a bending angle, the bending angle, i.e., for example, the inner angle between the respective side part and base part, being greater than 90° and, for example, having a value of between 91° and 95°. This has the advantage that the mounting region becomes ever tighter the farther the tool is slipped into the mounting region, and the elastic restoring force, e.g., spring force, which holds the tool and is induced by the increasing deflection of the bottom part, thus becomes greater. For example, at an angle between 91° and 95°, the amount of the restoring force is precisely in the range of the force that can be applied by humans. The use of stainless steel is considered advantageous because the latter is less susceptible to corrosion.

According to example embodiments, the respective insertion part is bent away from the respective side part at a bending angle, the bending angle, i.e., for example, the inner angle between the respective side part and the respective insertion part, being smaller than 180° and, for example, having a value of between 120° and 170°. This has the advantage that the mounting region becomes ever tighter the farther the tool is slipped into the mounting region, and the elastic restoring force, e.g., spring force, which holds the tool and is induced by the increasing deflection of the insertion parts, thus becomes greater. For example, at an angle between 120° and 170°, the amount of the restoring force is precisely in the range of the force that can be applied by humans.

According to example embodiments, the base part, the side parts, the cover part, the bottom part, and/or the insertion parts has/have a planar configuration in each case.

This has the advantage that a simple production from a planar sheet metal is possible by punching and subsequent bending of the individual parts.

According to example embodiments, a tool, e.g., of the system, is accommodated in the mounting region of the holding part and connected in a nonpositive manner to the holding part, e.g., in that the side parts are elastically preloaded and carry out a nonpositive holding function for the tool. This offers the advantage that only minimal force has to be applied when the tool is inserted.

According to example embodiments, the tool has a memory, e.g., an RFID tag or NFC tag, which is able to be read out in a contact-free manner and which, for example, stores an item of identifying information. This is considered advantageous insofar as an item of identifying information is storable in the memory, which is able to be read out by a reader device. Since the readout takes place in a contact-free manner, a readout may already be undertaken when the tool is not yet accommodated in the mounting region of the holding part.

According to example embodiments, a reader device, adapted for the contact-free readout of the memory, is situated on the holding part. This offers the advantage that charging and a display of information are possible as a function of the information stored in the memory using a display device.

According to example embodiments, the reader device is connected to a display device and/or to a charging device, the display device and/or the charging device being able to be actuated by the reader device as a function of the information stored in the memory and read out by the reader device in a contact-free manner. This offers the advantage that a warning is able to be displayed, which represents the insertion of an improper tool, or at least an approach of such a tool in the direction of the mounting region of the holding part, and/or which prevents the release of a charging voltage for the tool.

According to example embodiments, the charging device is electrically connected to contacts situated on the holding device, the tool accommodated in the holding part having an accumulator, which is electrically connectable to the contacts. This offers the advantage that through the contacting, electrical current is able to be conducted from the charging device to the tool centered by the holding part. As a result, an assigned tool is able to be charged when the reader device brings about a release of the charging voltage.

According to example embodiments, the range of the data transmission between the memory and the reader device goes beyond the mounting region of the holding part, and, thus, for example, exceeds it. This has the advantage that a warning is able to be displayed on the holding device even before the tool is inserted into the mounting region, the warning indicating that the improper tool is brought closer to the mounting region.

According to example embodiments, the reader device has a device for determining the change over time of the amplitude of the signal transmitted by the transmitter, the output signal of this device being conveyed to a comparison device, which compares the output signal to a threshold value, e.g., to zero, and the display device, e.g., of the reader device or the holding device, is actuated as a function of the result of the comparison. This offers the advantage that a warning will be displayed only when the tool approaches the holding device, e.g., in the direction of the reader device situated on the holding device. No corresponding information or no warning will thus be displayed when the tool is removed.

Further features and aspects of example embodiments of the present invention are described in greater detail below with reference to the appended schematic FIGURE.

BRIEF DESCRIPTION OF THE DRAWING

FIG. 1 is a perspective view of a holding part of a production system.

DETAILED DESCRIPTION

The holding part has a base part 7 which is adjoined by a bottom part 1 of the holding part rests, two side parts 4 of the holding part, and a cover part 5 of the holding part.

An insertion part 3 of the holding part is situated on the side of the respective side part 4 facing away from base part 7.

For example, the holding part with its base part 7, its cover part 5 and its side parts 4 with insertion parts 4 is arranged in one piece, e.g., as a single part, the production as a punched and bent part allowing for a particularly economical production.

In this production, a sheet metal area may be punched out of a sheet metal. A holding part can be produced by subsequently bending subregions. However, the bending angles deviate from 90°. This brings about a particularly efficient utilization of the holding part.

A mounting region is produced on the holding part in that bottom part 1 is bent away from base part 7 at a bending angle 6, bending angle 6, i.e., the inner angle between bottom part 1 and base part 7, being greater than 90° and, e.g., having a value of between 91° and 95°.

Cover part 5 is bent away from base part 7 at a bending angle 8, bending angle 8, i.e., the inner angle between cover part 5 and base part 7, being greater than 90° and, e.g., having a value of between 91° and 120°.

In the same manner, the two side parts 4 are bent away from base part 7 at a bending angle 9, bending angle 9, i.e., the inner angle between respective side part 4 and base part 7, being greater than 90° and, for example, having a value of between 91° and 95°.

Respective insertion part 3 is bent away from respective side part 4 at a bending angle 10, bending angle 10, i.e., the inner angle between respective side part 4 and respective insertion part 3, being smaller than 180° and, for example, having a value of between 120° and 170°.

The angles 6, 8, 9, 10 are selected so that the mounting region created by the holding part tapers with decreasing distance from the base part. In this manner, the insertion is able to be accomplished in a rapid and uncomplicated manner without requiring any particular expenditure of force.

The system has a tool 10, e.g., a battery-operated screwdriver, a battery-operated drill, or a similar device. The accumulator 14 of the tool is provided as a lower region of the tool in the gravitational direction and is slipped onto bottom part 1. When inserting the accumulator, e.g., of the tool, no particular force is required because the mounting region that tapers with decreasing distance from base part 7 makes the insertion easier.

Uninterrupted bores 2 are situated on the base part, and the hole pattern formed by bores 2 is a square, for example. With the aid of these bores 2, an attachment to a wall with the aid of screws is possible, the screw head pressing on base part 7 in each case.

The wall thickness, i.e., for example, the sheet thickness, of the sheet metal is, for example, selected to be so small that an elastic deflection of side parts 4, cover part 5, and/or of bottom part 1 in relation to base part 7 is possible using minimal force.

As a result, a tool accommodated in the mounting region is elastically held, e.g., by the side parts 4 which are elastically deflected when the tool is inserted into the mounting region.

The accumulator, for example, forms the underside of the tool.

In exemplary embodiments, an electrical connection device 40 is fixed in place on the holding part, which has at least two electrical first contacts 42 featuring different electrical potentials. Electrical charging of the accumulator is therefore possible if this accumulator 14 has two contacts 16 that are appropriately situated thereon and are electrically connectable to the two first contacts.

In exemplary embodiments, the tool 10 has a memory 12, e.g., an RFID tag and/or an NFC tag, which is able to be read out in a contact-free manner, and a reader device 20, adapted for reading out the memory, is situated on the holding part, which actuates a display device 22 of the reader device as a function of the information read out from the memory, e.g., in a contact-free manner, and/or which releases or blocks the voltage able to be provided at the first contacts. As a result, it can be displayed whether the correct accumulator or the correct tool is accommodated in the holding part. The mounting is carried out, e.g., as a function of whether the proper identifying information is stored in the memory.

In exemplary embodiments, corrosion-resistant stainless steel such as XCr17 is used as the material for the holding part, and in this manner the force required can also be applied by humans, especially when using the above-mentioned angular ranges between 91° and 95° or between 120° and 170°, e.g., where the sheet thickness is between 0.95 mm and 2.5 mm.

In example embodiments, the reader device 20 is connected to a display and/or charging device 30, the display device and/or the charging device being able to be actuated by the reader device as a function of the information stored in the memory and read out by the reader device in a contact-free manner.

The invention claimed is:

1. A system, comprising:
   a holding part including:
   a base part;
   first and second planar side parts extending from the base part, each planar side part having a first end connected to the base part;
   a first insertion part extending from a second end of the first planar side part opposite the first end of the first planar side part and bent relative to the first planar side part;
   a second insertion part extending from a second end of the second planar side part opposite the first end of the second planar side part and bent relative to the second planar side part;
   a bottom part;
   and a cover part;
   wherein the base part, the planar side parts, the insertion parts, the bottom part, and the cover part are arranged as one piece; and
   wherein the insertion parts form a mounting region that tapers with decreasing distance from the base part.

2. The system according to claim 1, wherein the holding part is arranged as a punched and bent part.

3. The system according to claim 2, wherein the holding part is formed of sheet metal.

4. The system according to claim 3, wherein a sheet thickness of the sheet metal is sufficiently thin that the side parts are elastically deflectable in relation to the base part.

5. The system according to claim 4, wherein the sheet thickness is between 0.95 mm and 2.5 mm.

6. The system according to claim 1, wherein the holding part is formed of stainless steel, a corrosion-resistant stainless steel, and/or XCr17.

7. The system according to claim 1, wherein the bottom part is bent away from the base part at a bending angle greater than 90° and/or between 91° and 95°.

8. The system according to claim 1, the cover part is bent away from the base part at a bending angle greater than 90° and/or between 91° and 120°.

9. The system according to claim 1, wherein two side parts are bent away from the base part at a bending angle greater than 90° and/or between 91° and 95°.

10. The system according to claim 1, wherein the insertion part is bent away from the side part at a bending angle smaller than 180° and/or between 120° and 170°.

11. The system according to claim 1, wherein the base part, the cover part, the bottom part, and/or the insertion parts are planar.

12. The system according to claim 1, further comprising a tool configured to actuate screw elements and/or screw nuts and/or a boring tool, wherein the holding part is configured to connect to the tool and/or the boring tool in a positive fit.

13. The system according to claim 12, wherein the side parts are elastically prestressed and are configured to provide a positive fit hold of the tool.

14. The system according to claim 11, further comprising a tool, wherein the mounting region of the holding part is configured to accommodate the tool, and the tool is configured to connect to the holding part.

15. The system according to claim 14, wherein the side parts are elastically preloaded and are configured to provide a nonpositive hold of the tool.

16. The system according to claim 1, further comprising a tool that includes a memory, an RFID tag, and/or an NFC tag configured to be read out in a contact-free manner and configured to store an item of identifying information, wherein the holding part is configured to connect to the tool in a positive fit manner.

17. The system according to claim 16, further comprising a reader device configured to contactlessly read the memory and arranged on the holding part.

18. The system according to claim 17, further comprising a display and/or charging device, wherein the reader device is connected to the display and/or charging device, the display and/or charging device being configured to be actuated by the reader device as a function of information stored in the memory and contactlessly read out by the reader device.

19. The system according to claim 18, wherein the charging device is electrically connected to contacts arranged on the holding part, the tool including an accumulator electrically connectable to the contacts.

20. The system according to claim 17, wherein a range of data transmission between the memory and the reader device extends beyond a mounting region of the holding part.

21. The system according to claim 17, wherein the reader device is configured to display a warning only if an amplitude of a signal sent from the memory and received by the reader device increases in a time characteristic, and to not display a warning if the amplitude decreases in the time characteristic.

22. The system according to claim 17, wherein the reader device is configured to determine a change over time of an amplitude of a signal transmitted between the reader device and the tool, the reader device is configured to compare an output signal to a threshold value and/or to zero, and the reader device, and/or a display device of the holding part is configured to actuate a display as a function of a result of the comparison.

* * * * *